(12) United States Patent
Sugawara et al.

(10) Patent No.: US 10,689,546 B2
(45) Date of Patent: Jun. 23, 2020

(54) METHOD FOR MANUFACTURING OPTICAL MEMBER

(71) Applicant: DEXERIALS CORPORATION, Tokyo (JP)

(72) Inventors: Naoto Sugawara, Tochigi (JP); Naoki Hayashi, Tochigi (JP); Tsukasa Nakamura, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 101 days.

(21) Appl. No.: 15/743,470

(22) PCT Filed: Apr. 28, 2016

(86) PCT No.: PCT/JP2016/063377
§ 371 (c)(1),
(2) Date: Jan. 10, 2018

(87) PCT Pub. No.: WO2017/022285
PCT Pub. Date: Feb. 9, 2017

(65) Prior Publication Data
US 2018/0201808 A1    Jul. 19, 2018

(30) Foreign Application Priority Data

Aug. 4, 2015    (JP) ................................. 2015-153895

(51) Int. Cl.
*B32B 7/12*        (2006.01)
*C09J 4/06*        (2006.01)
(Continued)

(52) U.S. Cl.
CPC ................. *C09J 4/06* (2013.01); *B05D 3/06* (2013.01); *B05D 7/24* (2013.01); *B32B 7/02* (2013.01);
(Continued)

(58) Field of Classification Search
CPC ...... B05D 3/06; B05D 7/24; C09J 4/06; C09J 7/10; B32B 7/02; B32B 7/12; B32B 17/06; B32B 27/00; B32B 27/16; B32B 27/30

See application file for complete search history.

(56) References Cited

U.S. PATENT DOCUMENTS

2005/0197450 A1\* 9/2005 Amano ................ C08K 5/0075
                                                                525/30
2006/0027321 A1\* 2/2006 Schaffer .................. B32B 37/12
                                                                156/330.9
(Continued)

FOREIGN PATENT DOCUMENTS

CN    102905886 A    1/2013
CN    103999141 A    8/2014
(Continued)

OTHER PUBLICATIONS

Aug. 9, 2016 International Search Report issued in International Patent Application No. PCT/JP2016/063377.
(Continued)

*Primary Examiner* — Daniel McNally
(74) *Attorney, Agent, or Firm* — Oliff PLC

(57) ABSTRACT

A method for manufacturing an optical member which can improve bonding properties between a first member having a light transmitting property and a second member. The method includes a precuring step of forming a photocuring precured resin layer on a surface of the first member or the second member, the photocuring precured resin layer having a thin film on a side to be bonded with the second member or the first member, a bonding step of bonding the first member and the second member via the precured resin layer, and a final curing step of final-curing the precured resin layer to form a light transmitting resin layer. It is thereby possible (Continued)

to reduce the elastic modulus of the precured resin layer, suppress protrusion during bonding, and improve bonding properties.

4 Claims, 7 Drawing Sheets

(51) Int. Cl.

| | | |
|---|---|---|
| *B32B 7/02* | (2019.01) | |
| *C09J 11/06* | (2006.01) | |
| *C09J 133/00* | (2006.01) | |
| *G09F 9/00* | (2006.01) | |
| *G02B 5/00* | (2006.01) | |
| *C09J 7/00* | (2018.01) | |
| *B32B 27/16* | (2006.01) | |
| *C09J 5/00* | (2006.01) | |
| *B32B 27/00* | (2006.01) | |
| *B05D 3/06* | (2006.01) | |
| *B05D 7/24* | (2006.01) | |
| *B32B 27/30* | (2006.01) | |
| *C09J 7/10* | (2018.01) | |
| *B32B 17/06* | (2006.01) | |
| *C03C 27/10* | (2006.01) | |
| *C09J 4/00* | (2006.01) | |

(52) U.S. Cl.
CPC ............... *B32B 7/12* (2013.01); *B32B 17/06* (2013.01); *B32B 27/00* (2013.01); *B32B 27/16* (2013.01); *B32B 27/30* (2013.01); *C03C 27/10* (2013.01); *C09J 4/00* (2013.01); *C09J 5/00* (2013.01); *C09J 7/00* (2013.01); *C09J 7/10* (2018.01); *C09J 11/06* (2013.01); *C09J 133/00* (2013.01); *G02B 5/00* (2013.01); *G09F 9/00* (2013.01)

(56) References Cited

U.S. PATENT DOCUMENTS

| | | | |
|---|---|---|---|
| 2009/0104448 A1* | 4/2009 | Thompson | B32B 37/12 428/413 |
| 2009/0186552 A1 | 7/2009 | Shinya et al. | |
| 2013/0029075 A1* | 1/2013 | Niiyama | G02F 1/133308 428/41.7 |
| 2014/0069581 A1 | 3/2014 | Ogawa et al. | |
| 2014/0248498 A1 | 9/2014 | Kobayashi et al. | |
| 2014/0290849 A1* | 10/2014 | Hayashi | G02F 1/1335 156/273.5 |
| 2016/0091791 A1* | 3/2016 | Iwata | G03F 7/2002 156/275.5 |
| 2019/0033633 A1 | 1/2019 | Ogawa et al. | |

FOREIGN PATENT DOCUMENTS

| | | |
|---|---|---|
| JP | H09-183637 A | 7/1997 |
| JP | 2004-333976 A | 11/2004 |
| JP | 2009186960 A | 8/2009 |
| JP | 2013-151151 A | 8/2013 |
| JP | 2015-060000 A | 3/2015 |
| JP | 2015-100748 A | 6/2015 |
| JP | 2015-127795 A | 7/2015 |
| JP | 2015-189931 A | 11/2015 |
| JP | 2015-223756 A | 12/2015 |
| KR | 2014-0109247 A | 9/2014 |
| TW | 201211196 A | 3/2012 |
| TW | 201331683 A | 8/2013 |
| TW | 201423207 A | 6/2014 |
| WO | 2013/057958 A1 | 4/2013 |
| WO | 2013/111810 A1 | 8/2013 |
| WO | 2014/091769 A1 | 6/2014 |
| WO | WO-2014091769 A1 * | 6/2014 ........... G02F 1/1335 |
| WO | WO-2014196355 A1 * | 12/2014 ........... C08F 290/067 |

OTHER PUBLICATIONS

Feb. 3, 2020 Office Action issued in Chinese Patent Application No. 201680042648.2.

* cited by examiner

METHOD FOR MANUFACTURING OPTICAL MEMBER

TECHNICAL FIELD

The present disclosure relates to a method for manufacturing an optical member having a first member having a light transmitting property and a second member which are laminated via an interposing light transmitting resin layer. This application claims priority to Japanese Patent Application No. 2015-153895 filed on Aug. 4, 2015, the entire contents of which are hereby incorporated by reference.

BACKGROUND ART

Conventionally, a technique is known of bonding a first member having a light transmitting property and a second member, for example, a light transmitting cover member and an image display member, with a photocuring resin composition and securing with a light transmitting resin layer.

For example, PLT 1 and 2 disclose a method of applying a photocuring resin composition in a liquid state to a first member and precuring to form a precured resin layer, and bonding an image display member to the precured resin layer before final curing.

CITATION LIST

Patent Literature

PLT 1: Japanese Unexamined Patent Application Publication No. 2013-151151 PLT 2: International Publication No. 2013/057958

SUMMARY OF INVENTION

Technical Problem

However, as in the techniques disclosed in PLT 1 and 2, in the case of an excessive elastic modulus in the precured resin layer, problems such as bubble generation during bonding tend to cause bonding defects. Furthermore, in the case of leaving the surface of the precured resin layer in an uncured state as in PLT 2, protrusion of uncured resin during bonding tends to cause bonding defects.

The present disclosure is proposed in view of such conventional circumstances and provides a method for manufacturing an optical member which can improve bonding properties between a first member having a light transmitting property and a second member.

Solution to Problem

As a result of earnest investigation, the present inventors have found that forming a precured resin layer, in which a thin film is formed on a side to which the first member or the second member is to be bonded, reduces an elastic modulus of the precured resin layer, suppresses protrusion of uncured resin during bonding, and improves bonding properties.

Thus, a method for manufacturing an optical member in which a first member having a light transmitting property and a second member are laminated via a light transmitting resin layer according to the present disclosure includes a precuring step of forming a photocuring precured resin layer on a surface of the first member or the second member, the photocuring precured resin layer having a thin film on a side to be bonded with the second member or the first member, a bonding step of bonding the first member and the second member via the precured resin layer, and a final curing step of final-curing the precured resin layer to form the light transmitting resin layer.

Furthermore, a photocuring resin composition according to the present disclosure includes, a photo-radical polymerizing poly(meth)acrylate, a photo-radical polymerizing (meth)acrylate, a softener comprising a liquid plasticizer or tackifier, a photoinitiator, and an ultraviolet absorber, wherein content of the ultraviolet absorber is 0.01 to 1.0 wt %.

Advantageous Effects of Invention

According to the present disclosure, forming a precured resin layer having a soft interior and having a thin film formed on a side to which the first member or the second member is to be bonded enables maintaining a low elastic modulus for the entire precured resin layer capable of being bonded while suppressing protrusion during bonding and improving bonding properties.

DESCRIPTION OF EMBODIMENTS

Figure 1:
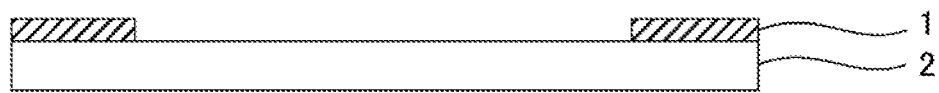
FIG. 1 is a view illustrating a step (A) according to a first embodiment.

Embodiments of the present disclosure will now be described in detail according to the following order with reference to the drawings.
1. Method for Manufacturing Optical Member
2. Photocuring Resin Composition
3. Examples

1. Method for Manufacturing Optical Member

A method for manufacturing an optical member according to the present embodiment, in which a first member having a light transmitting property and a second member are laminated via a light transmitting resin layer, includes a precuring step of forming a photocuring precured resin layer on a surface of the first member or the second member, the photocuring precured resin layer having a thin film on a side to be bonded with the second member or the first member, a bonding step of bonding the first member and the second member via the precured resin layer, and a final curing step of final-curing the precured resin layer to form the light transmitting resin layer. Forming a precured resin layer having a soft interior of uncured resin and having a thin film formed on the side to which the first member or the second member is to be bonded enables the elastic modulus of the entire precured resin layer to be maintained at a low elastic modulus capable of being bonded while suppressing protrusion of uncured resin during bonding and improving bonding properties.

Herein, a "thin film" is in a state allowing delamination from an upper surface side of the precured resin layer. Moreover, "uncured" is a state in which a curing reaction has either not progressed at all or the curing reaction ratio is low, flowability is comparable to that of initial application, and washing away with a solvent is possible.

In the method for manufacturing an optical member according to the present embodiment, the precured resin layer may be a film or sheet having a thin film formed by irradiating with ultraviolet light to raise a reaction ratio of one surface in advance.

Furthermore, the method for manufacturing an optical member according to the present embodiment preferably includes a forming step of forming a photocuring resin layer on the surface of the first member or the second member, and irradiating the photocuring resin layer with ultraviolet light to form the precured resin layer in the precuring step. In this case, a film or sheet formed from a photocuring resin composition may be used as the photocuring resin layer. The thin film of the precured resin layer is formed on the surface on the ultraviolet irradiation side; in the case of irradiating with ultraviolet light from the photocuring resin layer side, the reaction ratio of the precured resin layer gradually decreases in the depth direction away from the surface on the ultraviolet irradiation side. In the case of the first member or the second member, on which the photocuring resin layer is formed, being a transparent substrate, such as glass, and irradiating with ultraviolet light from both the photocuring resin layer side and the transparent substrate side, the reaction ratio of the precured resin layer decreases in the depth direction from the surface on the opposite side of the transparent substrate and then increases from approximately the center of the precured resin layer towards the transparent substrate.

Furthermore, a method for manufacturing an optical member according to the present embodiment preferably includes an applying step of applying a photocuring resin composition in a liquid state to the surface of the first member or the second member to form a photocuring resin layer, and irradiating the photocuring resin layer with ultraviolet light to form the precured resin layer in the precuring step. By applying the photocuring resin composition in a liquid state and forming a photocuring resin layer, it is possible to compensate for surface unevenness of the first member or the second member.

Hereinafter, a first embodiment and a second embodiment will be described in which a photocuring resin composition in a liquid state is applied to a surface of a first member or a second member to form a photocuring resin layer.

First Embodiment

Now, with reference to FIGS. 1 to 7, a first embodiment including an applying step (A), a precuring step (B), a bonding step (C), and a final curing step (D) will be described. Herein, a method for manufacturing a display device 10, which is an optical member, using a light transmitting cover member 2 having a light shielding layer 1 formed on a peripheral portion as the first member, and an image display member 6 as the second member is described.

The light transmitting cover member 2, so long as transmitting light to allow visibility of the image formed in the image display member 6, may be, for example, made of glass, acrylic resin, polyethylene terephthalate, polyethylene naphthalate, and polycarbonate, among other materials, in a plate or sheet form. These materials may be treated on one side or both sides with a hard coat or antireflection treatment, among other treatments. Physical properties such as thickness and elasticity of the light transmitting cover member 2 may be selected as appropriate according to intended use.

The light shielding layer 1 is provided, for example, to increase contrast of an image and can be formed by applying a black or otherwise colored coating material by screen printing, among other methods, and drying/curing the coating material. Thickness of the light shielding layer 1 is typically 5 to 100 µm and corresponds to a height difference 4.

Examples of the image display member 6 include liquid crystal display panels, organic EL display panels, plasma display panels, and touch panels. Herein, a touch panel is meant to include image display and input panels combining display elements such as liquid crystal display panels and positional input devices such as touch pads.

Applying Step (A)

Figure 2:
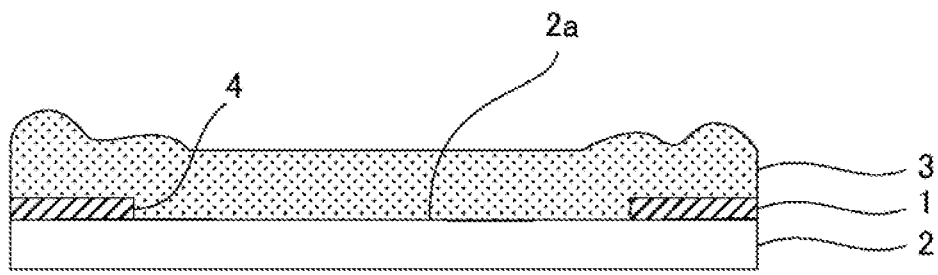
FIG. 2 is a view illustrating a step (A) according to a first embodiment.

First, in the applying step (A), as illustrated in FIG. 1, a light transmitting cover member 2 provided with a light shielding layer 1 on a peripheral portion of one side is prepared; as illustrated in FIG. 2, a photocuring resin composition in a liquid state is applied onto a surface 2a of the light transmitting cover member 2 to form a photocuring resin layer 3. Herein, a liquid state means a state in which viscosity is 0.01 to 100 Pa*s (25° C.) as measured by a Brookfield type viscometer.

Furthermore, in the applying step (A), it is preferable to apply the photocuring resin composition in a liquid state at a thickness that is greater than a thickness of the light shielding layer 1. In particular, the photocuring resin composition is applied across the entirety of the light shielding layer side surface 2a of the light transmitting cover member 2, including the surface of the light shielding layer 1, at a thickness of preferably 1.2 to 50 times and more preferably 2 to 30 times the thickness of the light shielding layer 1. Moreover, application thickness is preferably 25 to 350 µm and more preferably 50 to 300 µm. It should be noted that the photocuring resin composition 3 may be applied multiple times to achieve a required thickness.

By applying the photocuring resin composition at a thickness greater than the thickness of the light shielding layer 1, in the bonding step (C) to be described below, even in the case of the height difference 4 existing in the thickness direction between the light transmitting cover member 2 and the light shielding layer 1, a soft interior of a precured resin layer 5 can compensate for the height difference 4, thus improving bonding properties.

Precuring Step (B)

Figure 3:
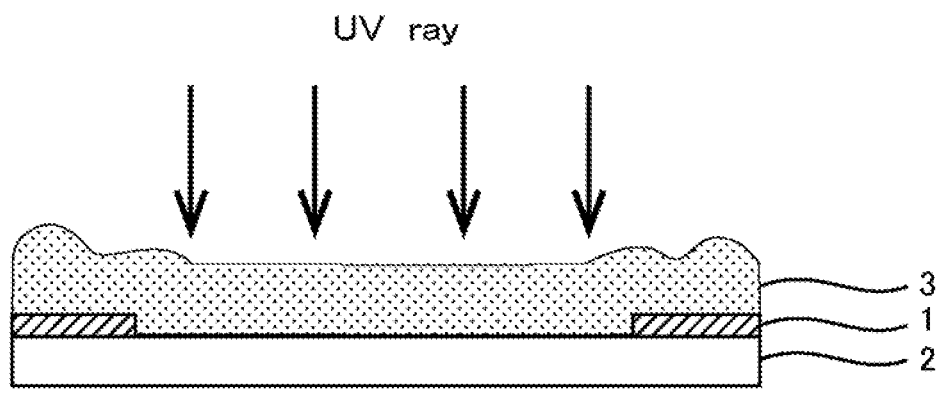
FIG. 3 is a view illustrating a step (B) according to a first embodiment.
Figure 4:
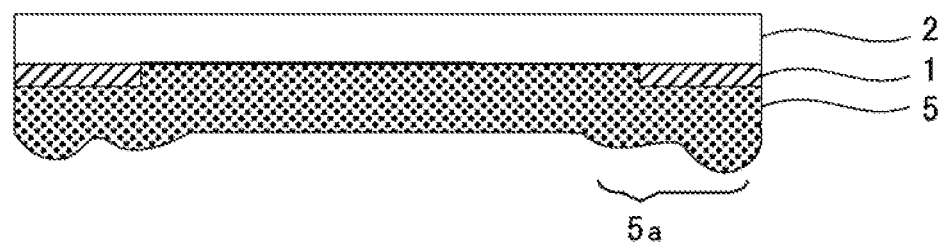
FIG. 4 is a view illustrating a step (C) according to a first embodiment.

Next, in the curing step (B), as illustrated in FIG. 3, the photocuring resin layer 3 is irradiated with ultraviolet light to precure the photocuring resin layer 3; as illustrated in FIG. 4, a precured resin layer 5 is formed having a thin film formed on a surface. Thereby, the elastic modulus of the entire precured resin layer 5 can be maintained at a low elastic modulus enabling bonding while also suppressing protrusion during the subsequent bonding step (C) and improving bonding properties.

Furthermore, the reaction ratio at the surface of the precured resin layer 5 is preferably 60% or more and more preferably 80% or more. Moreover, a depth at which the reaction ratio falls below 60% is preferably 30 µm or more and more preferably 60 µm or more from the surface of the precured resin layer 5. Decreasing the depth at which the reaction ratio falls below 60% decreases the thickness of the thin film and tends to increase the likelihood of uncured resin of the interior protruding. Moreover, increasing the depth at which the reaction ratio falls below 60% increases the thickness of the thin film, which increases the elastic modulus of the precured resin layer 5 and tends to reduce conformability during bonding.

The reaction ratio in the depth direction of the precured resin layer 5 can be calculated using a microscope laser Raman spectroscopy device by irradiating the precured resin layer 5 with an excitation laser from the upper surface side and moving the sample stage vertically to confocally collect Raman scattered light in order to measure a Raman spectrum at a desired depth from the upper surface of the precured resin layer 5. In particular, the reaction ratio can be calculated from the height ratio of the 2D (G') band peak height observed in the 2,700 cm$^{-1}$ vicinity of a Raman spectrum to the C=C peak height observed in the 1,645 cm$^{-1}$ vicinity of the Raman spectrum corresponding to (meth)acryl groups.

Thickness of the thin film of the precured resin layer 5 is preferably 3% to 70% and more preferably 10% to 40% of the thickness of the precured resin layer 5. In particular, the thickness of the thin film is preferably 5 to 100 µm and more preferably 20 to 80 µm. Insufficient thickness of the thin film tends to increase the likelihood of uncured resin of the interior protruding, and excessive thickness of the thin film causes difficulties in maintaining a low elastic modulus, thereby tending to degrade conformability during bonding.

Examples of methods for forming the precured resin layer 5 having the thin film formed on a surface include methods of adding an ultraviolet absorber to the photocuring resin composition, methods of irradiating the photocuring resin layer with a short-wave ultraviolet light to cure only the surface, and methods of adding an excess of photopolymerization initiator to the photocuring resin composition.

Bonding Step (C)

Figure 5:
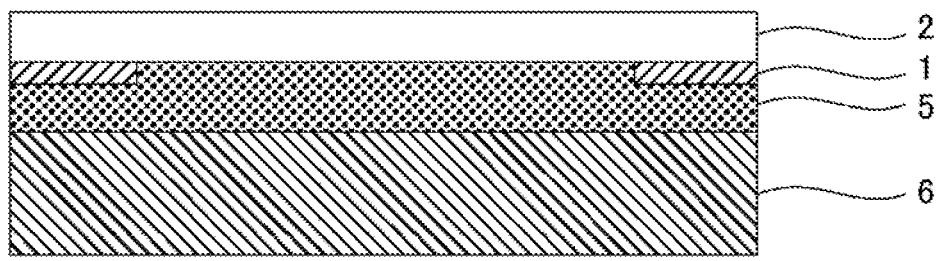
FIG. 5 is a view illustrating a step (C) according to a first embodiment.

Next, in the bonding step (C), as illustrated in FIG. 4, the precured resin layer 5 is inverted; as illustrated in FIG. 5, the precured resin layer 5 side of the light transmitting cover member 2 is bonded to the image display member 6. The thin film formed on the surface of the precured resin layer 5 prevents uncured resin from flowing and falling away when inverted. Furthermore, as illustrated in FIGS. 1 to 4, micro concaves/convexes 5a caused by the light shielding layer 1 and by surface tension are generated in a peripheral portion of the upper surface of the precured resin layer 5; however, because the interior of the precured resin layer 5 is nearly in a liquid state, it is possible for the precured resin layer 5 to be packed down. Moreover, because the thin film on the surface of the precured resin layer 5 conforms with the surface of the image display member 6 due to packing down the precured resin layer 5, it is possible to both suppress bubble generation and flatten the micro concaves/convexes 5a. Bonding may employ well-known bonding devices with compression applied at 10 to 80° C.

Final Curing Step (D)

Figure 6:
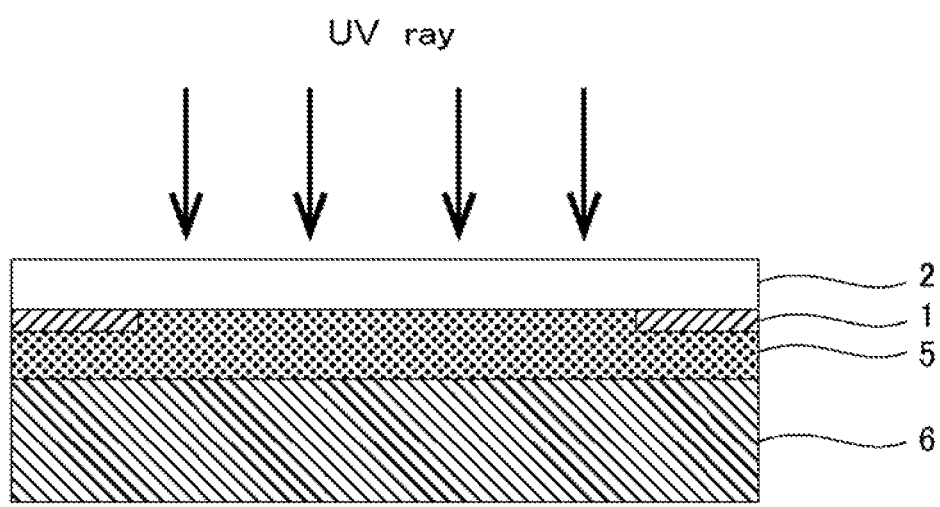
FIG. 6 is a view illustrating a step (D) according to a first embodiment.
Figure 7:
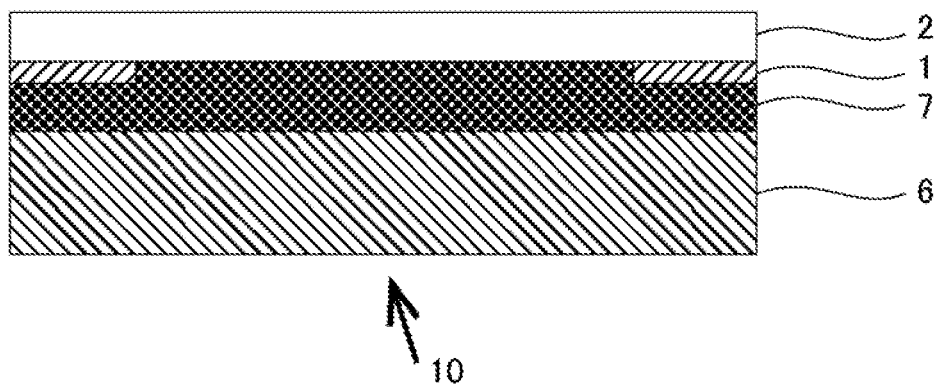
FIG. 7 is a view illustrating a step (D) according to a first embodiment.

Next, in the final curing step (D), as illustrated in FIG. 6, the precured resin layer 5 sandwiched between the image display member 6 and the light transmitting cover member 2 is irradiated with ultraviolet light to final-cure the precured resin layer 5. Furthermore, according to need, the precured resin layer 5 between the light shielding layer of the light transmitting cover member 2 and the image display member 6 may also be irradiated with ultraviolet light to final-cure the precured resin layer 5. Thereby, as illustrated in FIG. 7, an image display device 10 can be manufactured in which the light transmitting cover member 2 and the image display member 6 are laminated via a light transmitting resin layer 7.

Furthermore, in the final curing step (D), the reaction ratio in the light transmitting resin layer 7 is preferably 90% or more and more preferably 95% or more. By sufficiently curing the light transmitting resin layer 7, adhesive force between the light transmitting cover member 2 and the image display member 6 can be improved. It should be noted that the reaction ratio of the light transmitting resin layer 7 can be measured in the same way as in the precured resin layer 5 by a microscope laser Raman spectroscopy device. Moreover, the light transmitting resin layer 7 has a level of light transmittance allowing visibility of an image formed in the image display member 6.

Second Embodiment

Now, with reference to FIGS. 8 to 13, a second embodiment including an applying step (AA), a precuring step (BB), a bonding step (CC), and a final curing step (DD) will be described. In the first embodiment, an example is described in which the photocuring resin composition 3 is applied to the light shielding layer 1 side surface of the light transmitting cover member 2; in the second embodiment, an example will be described in which the photocuring resin composition 3 is applied to the surface of the image display member 6. It should be noted that, in FIGS. 1 to 7 and FIGS. 8 to 13, same elements are denoted with same reference signs, and therefore will not be further explained here.

Applying Step (AA)

Figure 8:
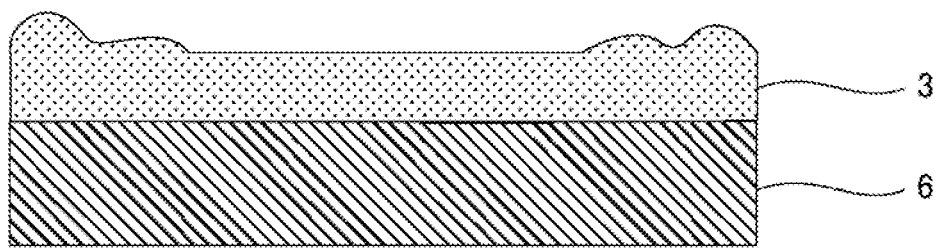
FIG. 8 is a view illustrating a step (AA) according to a second embodiment.

First, in the applying step (AA), as illustrated in FIG. 8, a photocuring resin composition 3 in a liquid state is applied to a surface of the image display member 6 to form a photocuring resin layer 3. In the applying step (AA), as in the first embodiment, it is preferable to apply the photocuring resin composition in a liquid state at a thickness that is greater than the thickness of the light shielding layer 1 of the light transmitting cover member 2. In particular, the photocuring resin composition is applied across the entire surface of the image display member 6 at a thickness of preferably 1.2 to 50 times and more preferably 2 to 30 times the thickness of the light shielding layer 1. In particular, the application thickness is preferably 25 to 350 µm and more preferably 50 to 300 µm. It should be noted that the photocuring resin composition 3 may be applied multiple times to achieve a required thickness.

By applying the photocuring resin composition at a thickness that is greater than the thickness of the light shielding layer 1, in the bonding step (CC) to be described below, even in the case of the height difference 4 existing in the thickness direction between the light transmitting cover member 2 and the light shielding layer 1, because the thin film on the surface of the precured resin layer 4 conforms with the height difference 4, bonding properties can be improved.

Precuring Step (BB)

Figure 9:
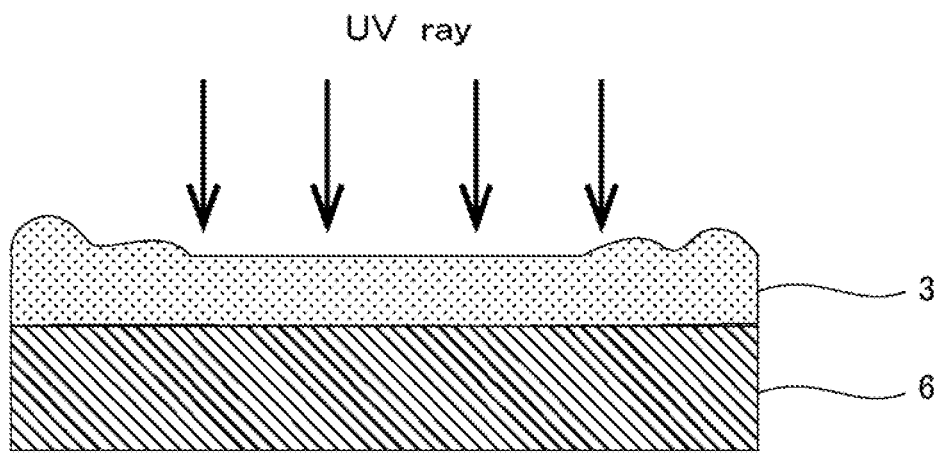
FIG. 9 is a view illustrating a step (BB) according to a second embodiment.
Figure 10:
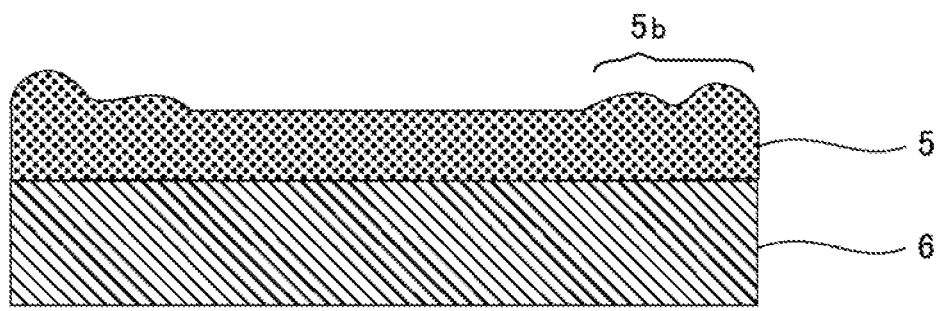
FIG. 10 is a view illustrating a step (BB) according to a second embodiment.

Next, in the precuring step (BB), as illustrated in FIG. 9, the photocuring resin layer 3 is irradiated with ultraviolet light to precure the photocuring resin layer 3; as illustrated in FIG. 10, a precured resin layer 5 is formed having a thin film formed on a surface. Thereby, the elastic modulus of the precured resin layer 5 is reduced, which suppresses protrusion in the subsequent bonding step (CC) and improves bonding properties.

Furthermore, as in the first embodiment, the reaction ratio at the surface of the precured resin layer 5 is preferably 60% or more and more preferably 80% or more. Moreover, a depth at which the reaction ratio falls below 60% is preferably 30 μm or more and more preferably 60 μm or more from the surface of the precured resin layer 5. Decreasing the depth at which the reaction ratio falls below 60% decreases the thickness of the thin film and tends to increase the likelihood of uncured resin of the interior protruding. Furthermore, increasing the depth at which the reaction ratio falls below 60% increases the thickness of the thin film, which increases the elastic modulus of the precured resin layer 5 and tends to reduce conformability during bonding.

Furthermore, as in the first embodiment, thickness of the thin film of the precured resin layer 5 is preferably 3% to 70% and more preferably 10% to 40% of the thickness of the precured resin layer 5. In particular, the thickness of the thin film is preferably 5 to 100 μm and more preferably 20 to 80 μm. Insufficient thickness of the thin film tends to increase the likelihood of uncured resin of the interior protruding, and excessive thickness of the thin film causes difficulties in maintaining a low elastic modulus, thereby tending to degrade conformability during bonding.

Bonding Step (CC)

Figure 11:
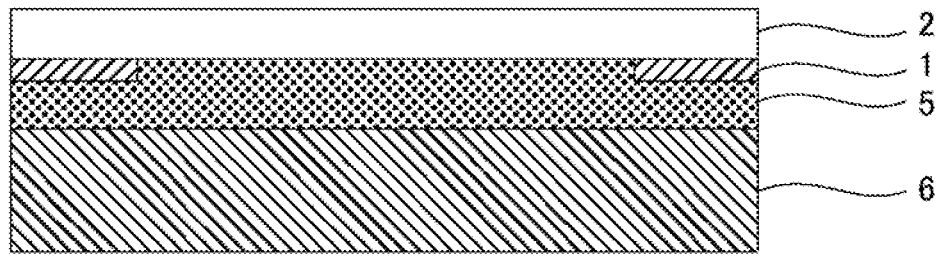
FIG. 11 is a view illustrating a step (CC) according to a second embodiment.

Next, in the bonding step (CC), as illustrated in FIG. 11, the precured resin layer on the image display member 6 is bonded to the light transmitting cover member 2. As illustrated in FIGS. 8 to 10, micro concaves/convexes 5b caused by surface tension are generated in a peripheral portion of the upper surface of the precured resin layer 5; however, because the interior of the precured resin layer 5 is nearly in a liquid state, it is possible for the precured resin layer 5 to be packed down. Moreover, because the thin film on the surface of the precured resin layer 5 conforms with the surface of light transmitting cover member 2 due to being packed down, it is possible to both suppress bubble generation and flatten the micro concaves/convexes 5b. Furthermore, even in the case of the height difference 4 existing in the thickness direction between the light transmitting cover member 2 and the light shielding layer 1, because the thin film on the surface of the precured resin layer 5 conforms with the height difference 4, bubble generation is suppressed, and bonding properties can be improved. Bonding may employ well-known bonding devices with compression applied at 10 to 80° C.

Final Curing Step (DD)

Figure 12:
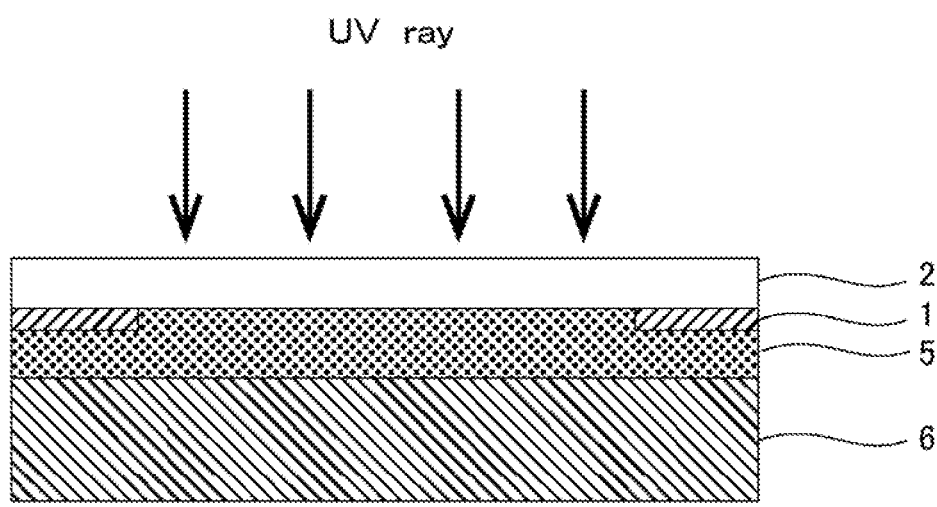
FIG. 12 is a view illustrating a step (DD) according to a second embodiment.
Figure 13:
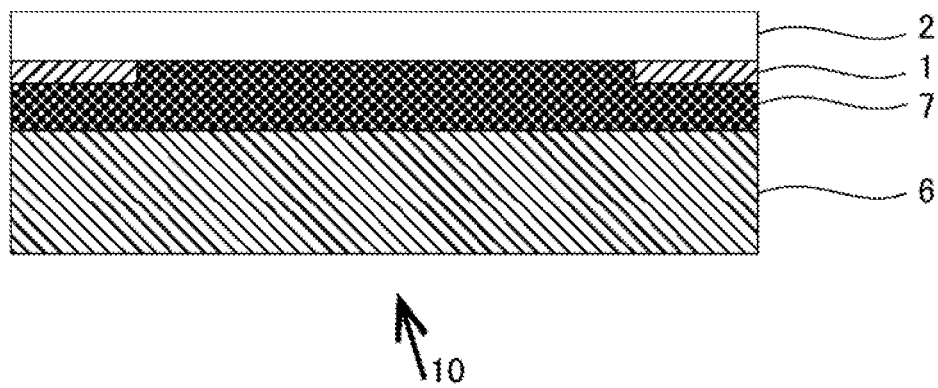
FIG. 13 is a view illustrating a step (DD) according to a second embodiment.

Next, in the final curing step (DD), as in the first embodiment and as illustrated in FIG. 12, the precured resin layer 5 sandwiched between the image display member 6 and the light transmitting cover member 2 is irradiated with ultraviolet light to final-cure the precured resin layer 5. Furthermore, according to need, the precured resin layer 5 between the light shielding layer of the light transmitting cover member 2 and the image display member 6 may also be irradiated with ultraviolet light to final-cure the precured resin layer 5. Thereby, as illustrated in FIG. 13, an image display device 10 can be manufactured in which the light transmitting cover member 2 is laminated to the image display member 6 via a light transmitting resin layer 7.

2. Photocuring Resin Composition

Next, a photocuring resin composition containing an ultraviolet absorber used in the method for manufacturing an optical member will be described. A photocuring resin composition according to the present embodiment includes a photo-radical polymerizing poly(meth)acrylate (component (a)), a photo-radical polymerizing (meth)acrylate (component (b)), a softener comprising a liquid plasticizer (component (c)) or tackifier (component (d)), a photoinitiator (component (e)), and an ultraviolet absorber (component (f)). It should be noted that, herein, (meth)acrylate is meant to include acrylic acid esters (acrylate) and methacrylic acid esters (methacrylate).

Component (a)

Preferable examples of the photo-radical polymerizing poly(meth)acrylate (component (a)) include (meth)acrylate oligomers having a polyurethane, polyisoprene, or polybutadiene skeleton, among others. Preferable examples of (meth)acrylate oligomers having a polyurethane skeleton include aliphatic urethane acrylate (EBECRYL230 (molecular weight: 5,000), available from Daicel-Cytec Company, Ltd.; UA-1, available from LIGHT CHEMICAL INDUSTRIES CO., LTD.), among others. Furthermore, preferable examples of (meth)acrylate oligomers having a polyisoprene skeleton include esterified products of polyisoprene with maleic anhydride adduct and 2-hydroxyethyl methacrylate (UC102 (molecular weight: 17,000 in terms of polystyrene) available from Kuraray Co., Ltd.), UC203 (molecular weight: 35,000 in terms of polystyrene) available from Kuraray Co., Ltd.), and UC-1 (molecular weight: 25,000) available from Kuraray Co., Ltd.), among others.

Component (b)

Preferable examples of the photo-radical polymerizing (meth)acrylate (component (b)) include 2-hydroxypropyl (meth)acrylate, benzyl acrylate, dicyclopentenyloxyethyl (meth)acrylate, isobornyl (meth)acrylate, and octyl (meth) acrylate.

Component (c)

The liquid plasticizer (component (c)) is not photocured itself when irradiated with ultraviolet light but imparts softness to a cured resin layer or a precured resin layer after photocuring and reduces a curing shrinkage ratio of a cured resin layer or a precured resin layer. For example, at least one of the following group comprising polybutadiene-based plasticizers, polyisoprene-based plasticizers, phthalate ester-based plasticizers, and adipate ester-based plasticizers in a liquid state may be selected as such a liquid plasticizer.

Component (d)

The tackifier (component (d)), as in the component (c), imparts softness to a cured resin layer or a precured resin layer after photocuring, and improves initial adhesive strength (known as tackiness) of the cured resin layer or the precured resin layer formed from the photocuring resin composition. Examples of the tackifier include terpene-based resins such as terpene resins, terpene phenolic resins, and hydrogenated terpene resins, rosin resins such as natural rosins, polymerized rosins, rosin esters, and hydrogenated rosins, petroleum resins such as polybutadiene, and polyisoprene, among others. As the softener, either the component (c) or the component (d) may be used so long as at least one is included.

Component (e)

Examples of the photoinitiator (component (e)) include 1-hydroxy-cyclohexyl-phenyl-ketone (IRGACURE 184, available from BASF Japan Ltd.), 2-hydroxy-1-{4-[4-(2-hydroxy-2-methyl-propionyl)-benzyl]-phenyl}-2-methyl-1-propan-1-one (IRGACURE 127, available from BASF Japan Ltd.), benzophenone, and acetophenone, among others.

Insufficient addition of the photoinitiator leads to insufficient curing when irradiating with ultraviolet light and excessive addition of the photoinitiator tends to cause bubble defects due to increased outgassing caused by cleavage; therefore, the addition amount is preferably 0.1 to 10 pts. mass and more preferably 0.2 to 5 pts. mass with respect to 100 pts. mass of the photo-radical polymerizing poly (meth)acrylate.

Component (f)

Examples of the ultraviolet absorber (component (f)) include benzotriazole-based ultraviolet absorber, hydroxyphenyl triazine-based ultraviolet absorber, benzophenone-based ultraviolet absorber, benzoate-based ultraviolet absorber, among others; these may also be used in a combination of two or more. Among these, it is preferable to use a benzotriazole-based ultraviolet absorber. Examples of commercially available products of benzotriazole-based ultraviolet absorber include 2-(2-hydroxy-5-tert-butylphenyl)-2H-benzotriazole, TINIUVIN PS available from BASF Japan Ltd.

Insufficient content of the ultraviolet absorber causes the entire precured resin layer to be cured, and excessive content of the ultraviolet absorber tends to cause insufficient curing of the surface of the precured resin layer; therefore, content of the ultraviolet absorber is preferably 0.01 to 1.0 wt % and more preferably 0.1 to 0.4 wt % of the entire photocuring resin composition.

In addition to the above-mentioned components (a) to (f), various additives may be added to the photocuring resin composition as long as effects of the present disclosure are not impaired. For example, to adjust the molecular weight of the cured resin, a chain transfer agent such as 2-mercaptoethanol, lauryl mercaptan, glycidyl mercaptan, mercaptoacetic acid, 2-ethylhexyl thioglycolate, 2,3-dimethylcapto-1-propanol, and α-methylstyrene dimer, among others, may be blended. In addition, typical additives such as adhesion improvers, for example, silane coupling agents, and antioxidants can be included as necessary. Such a photocuring resin composition can be prepared by uniformly mixing the above-mentioned components (a) to (f) as well as various additives, which may be added according to need, using known mixing methods.

EXAMPLES

4. Examples

In the present examples, onto a first member having a light transmitting property, a photocuring resin compositions was coated to form a photocuring resin layer, the photocuring resin layer was precured to form a precured resin layer, and reaction ratios in the depth direction from a surface of the precured resin layer were measured. Then, the first member was bonded to a second member, and bonding properties were evaluated. It should be noted that the present disclosure is not limited to these examples.

Reaction ratios were measured and bonding properties were evaluated for the precured resin layer in the following manner.

Precured Resin Layer Reaction Ratio Measurement

Using a microscope Raman spectroscopy device, a precured resin layer was irradiated with an excitation laser light from an upper surface side and the sample stage was moved vertically to confocally collect Raman scattered light in order to measure the Raman spectra at selected depths from the upper surface of the precured resin layer.

Reaction ratios were calculated from height ratios of the 2D (G') band peak heights observed in the 2,700 $cm^{-1}$ vicinity of the Raman spectra to the C=C peak heights observed in the 1,645 $cm^{-1}$ vicinity of the Raman spectra corresponding to (meth)acryl groups.

First, a sample of a photocuring resin composition was applied to a glass plate to form a photocuring resin layer at a thickness of 150 and a peak height ratio at a depth of 30 μm from the upper surface of the photocuring resin layer was regarded as corresponding to a reaction ratio of 0%. Then, the photocuring resin layer was entirely cured with a radiant exposure of 10,000 $mJ/cm^2$ to form a light transmitting resin layer, and a peak height ratio at a depth of 30 μm from the upper surface of the light transmitting resin layer was regarded as corresponding to a reaction ratio of 100%. The above relation was used to prepare a calibration curve relating peak height ratios to reaction ratios.

Then, a sample of the photocuring resin composition was applied to a glass plate to form a photocuring resin layer having a thickness of 150 μm; the photocuring resin layer was precured under irradiation conditions of 50 $mW/cm^2$ for 0.4 s to form a precured resin layer, and peak height ratios at selected depths from the upper surface of the precured resin layer were substituted into the calibration curve to calculate reaction ratios.

Bonding Properties Evaluation

To evaluate bonding properties, a first member and a second member were bonded via a precured resin layer, which were then observed in this state; cases in which bubbles were not generated in the precured resin layer and in which the precured resin layer spread less than 3% from initial form were evaluated as "A," and cases in which bubbles were generated were evaluated as "B." Moreover, cases in which bubbles were not generated in the precured resin layer and in which the precured resin layers spread 3% to 10% from initial form were evaluated as "A'."

Example 1

As represented in Table 1, a photocuring resin composition in a liquid state containing 0.1% ultraviolet absorber was prepared by blending 43.0 pts. mass of a urethane oligomer, 58.0 pts. mass of a (meth)acrylate monomer, 69.0 pts. mass of a liquid plasticizer, 25.0 pts. mass of a tackifier, 2.0 pts. mass of a photoinitiator, and 0.2 pts. mass of an ultraviolet absorber.

The photocuring resin composition in a liquid state was applied onto 45×85 mm glass plates at a thickness of 150 μm to form photocuring resin layers. The photocuring resin layers were precured by irradiating with ultraviolet light from the photocuring resin layer side under conditions of 50 $mW/cm^2$ for 0.4 s to form precured resin layers having thin films formed on their surfaces. Then, 45×85 mm glass plates were vacuum bonded to the precured resin layers. Evaluation of bonding properties after vacuum bonding was A.

Example 2

Figure 14:
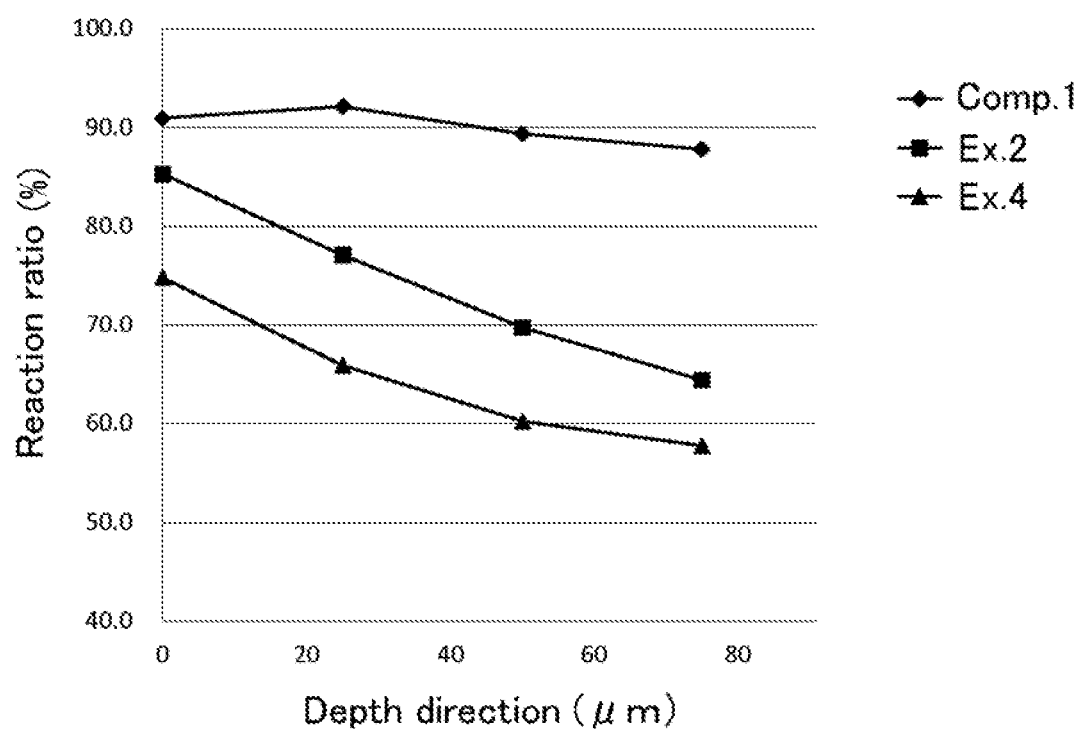
FIG. 14 is a graph representing reaction ratios with respect to a depth direction of the precured resin layer.

As represented in Table 1, with the exception that 0.4 pts. mass of an ultraviolet absorber was blended so that content of the ultraviolet absorber was 0.2%, a photocuring resin composition in a liquid state was prepared and precured resin layers were formed as in Example 1. Thin films were formed on surfaces of the precured resin layers. Reaction ratios in the depth direction of the precured resin layers are represented in FIG. 14. As represented in FIG. 14, the reaction ratio at the surface was approximately 85% and the depth at which the reaction ratio fell below 60% was 80 µm or more from the surface. Moreover, thin films were delaminated from the surfaces of the precured resin layers and these were measured to have a thickness of approximately 60 µm. Glass plates were vacuum bonded to the precured resin layers. Evaluation of bonding properties after vacuum bonding was A.

Example 3

As represented in Table 1, with the exception that 0.6 pts. mass of an ultraviolet absorber was blended so that content of the ultraviolet absorber was 0.3%, a photocuring resin composition in a liquid state was prepared and precured resin layers were formed as in Example 1. Thin films were formed on surfaces of the precured resin layers. Glass plates were then vacuum bonded to these precured resin layers. Evaluation of bonding properties after vacuum bonding was A.

Example 4

As represented in Table 1, with the exception that 0.8 pts. mass of an ultraviolet absorber was blended so that content of the ultraviolet absorber was 0.4%, a photocuring resin composition in a liquid state was prepared and precured resin layers were formed as in Example 1. Thin films were formed on surfaces of the precured resin layers. As represented in FIG. 14, the reaction ratio at the surface was approximately 75% and the depth at which the reaction ratio fell below 60% was approximately 50 µm from the surface. Moreover, thin films were delaminated from the surfaces of the precured resin layers and these were measured to have a thickness of approximately 20 µm. Glass plates were vacuum bonded to the precured resin layers. Evaluation of bonding properties after vacuum bonding was A'.

Comparative Example 1

As represented in Table 1, with the exception that the ultraviolet absorber was not blended, a photocuring resin composition in a liquid state was prepared and precured resin layers were formed as in Example 1. The precured resin layers were entirely cured. As represented in FIG. 14, the reaction ratio at the surface was 90% or more, and the reaction ratio from the surface to a depth of 80 µm was 80% or more. Glass plates were then vacuum bonded to these precured resin layers. After vacuum bonding, bubbles were generated in the precured resin layers, and evaluation of bonding properties was B.

TABLE 1

|  | Ex. 1 | Ex. 2 | Ex. 3 | Ex. 4 | Comp. 1 |
|---|---|---|---|---|---|
| Urethane oligomer | 43.0 | 43.0 | 43.0 | 43.0 | 43.0 |
| (Meth)acrylate monomer | 58.0 | 58.0 | 58.0 | 58.0 | 58.0 |
| Liquid plasticizer | 69.0 | 69.0 | 69.0 | 69.0 | 69.0 |
| Tackifier | 25.0 | 25.0 | 25.0 | 25.0 | 25.0 |
| Photoinitiator | 2.0 | 2.0 | 2.0 | 2.0 | 2.0 |
| Ultraviolet absorber | 0.2 | 0.4 | 0.6 | 0.8 | 0.0 |

TABLE 1-continued

|  | Ex. 1 | Ex. 2 | Ex. 3 | Ex. 4 | Comp. 1 |
|---|---|---|---|---|---|
| Total [pts. mass] | 197.2 | 197.4 | 197.6 | 197.8 | 197.0 |
| Ultraviolet absorber content [%] | 0.1 | 0.2 | 0.3 | 0.4 | 0.0 |
| Bonding properties evaluation | A | A | A | A | B |

Urethane oligomer: aliphatic urethane acrylate (EBECRYL230 (molecular weight: 5,000), Daicel-Cytec Company, Ltd.)
(Meth)acrylate monomer: 2-hydroxypropyl (meth)acrylate
Liquid plasticizer: polybutadiene-based plasticizer
Tackifier: terpene resin
Photoinitiator: 1-hydroxy-cyclohexyl-phenyl-ketone (IRGACURE 184, BASF Japan Ltd.)
Ultraviolet absorber: 2-(2-hydroxy-5-tert-butylphenyl)-2H-benzotriazole (TINIUVIN PS, BASF Japan Ltd.)

As in Comparative Example 1, in the case of not blending the ultraviolet absorber, the reaction ratio from the surface to a depth of 80 µm was 80% or more, and the precured resin layers were entirely cured, causing bubbles to be generated during bonding. Furthermore, due to oxygen inhibiting curing of the photocuring resin composition, the reaction ratio at the surface of the precured resin layers was lower than the reaction ratio at a depth of 25 µm from the surface.

In contrast, as in Examples 1 to 4, in the case of adding an appropriate amount of the ultraviolet absorber, it was possible to form precured resin layers having thin films formed on their surfaces, thereby improving bonding properties. Furthermore, as in Example 2, it was revealed that by the reaction ratio at the surface being approximately 85% and by the depth from the surface at which the reaction ratio falls below 60% being 80 µm or more, thin films having a thickness of approximately 60 µm were formed, thereby improving conformability with surfaces of the glass plates and enabling excellent bonding properties.

Still further, as in Example 4, it was revealed that by the reaction ratio at the surface being approximately 75% and by the depth at which the reaction ratio falls below 60% being approximately 50 µm from the surface, thin films having a thickness of approximately 20 µm were formed, although some spreading occurred, conformability with surfaces of the glass plates was improved and excellent bonding properties could be achieved.

REFERENCE SIGNS LIST

1 light shielding layer, 2 light transmitting cover member, 3 photocuring resin layer, 4 height difference, 5 precured resin layer, 6 image display member, 7 light transmitting resin layer

The invention claimed is:

1. A method for manufacturing an optical member in which a first member having a light transmitting property and a second member are laminated via a light transmitting resin layer comprising:
    an applying step of applying a photocuring resin composition in a liquid state to the surface of the first member or the second member to form a photocuring resin layer;
    a precuring step of forming a photocuring precured resin layer on a surface of the first member or the second member, the photocuring precured resin layer having a thin film on a side to be bonded with the second member or the first member;
    a bonding step of bonding the first member and the second member via the precured resin layer; and
    a final curing step of final-curing the precured resin layer to form the light transmitting resin layer; wherein
    the photocuring resin composition consists of photoradical polymerizing poly(meth)acrylate, a photo-radical polymerizing (meth)acrylate, a softener comprising a liquid plasticizer or tackifier, a photoinitiator, and an ultraviolet absorber, the precuring step comprises irradiating the photocuring resin layer with ultraviolet light to form the precured resin layer, the final curing step comprises irradiating the photocuring resin layer with ultraviolet light to form the light transmitting resin layer, a reaction ratio of a surface of the precured resin layer is 80% or more, and a depth at which the reaction ratio falls below 60% is 60 µm or more from the surface of the precured resin layer.

2. The method for manufacturing an optical member according to claim 1, wherein the thin film of the precured resin layer has a thickness that is 3% to 70% of the thickness of the precured resin layer.

3. The method for manufacturing an optical member according to claim 1, wherein the thin film of the precured resin layer has a thickness of 5 to 100 µm.

4. The method for manufacturing an optical member according to claim 1, wherein the ultraviolet absorber is selected from the group consisting of benzotriazole-based ultraviolet absorber, hydroxyphenyl triazine-based ultraviolet absorber, benzophenone-based ultraviolet absorber, and benzoate-based ultraviolet absorber.

* * * * *